Nov. 24, 1936.    B. PRATT ET AL    2,061,716
ROTARY DISK VALVE
Filed March 27, 1933    5 Sheets-Sheet 1

Inventor
Best Pratt.
George F. Weinreich.

By Cushman, Byrpritt, Darby & Cushman
Attorneys

Nov. 24, 1936.   B. PRATT ET AL   2,061,716
ROTARY DISK VALVE
Filed March 27, 1933   5 Sheets-Sheet 2
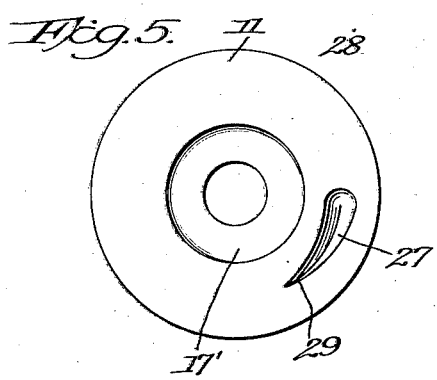
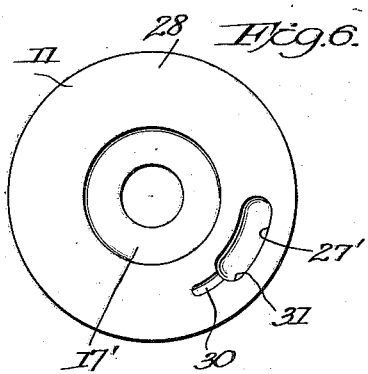
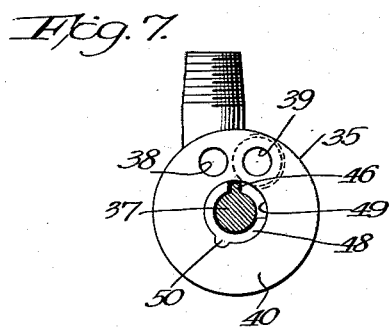
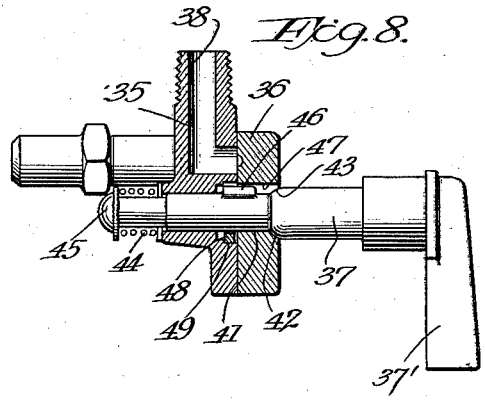
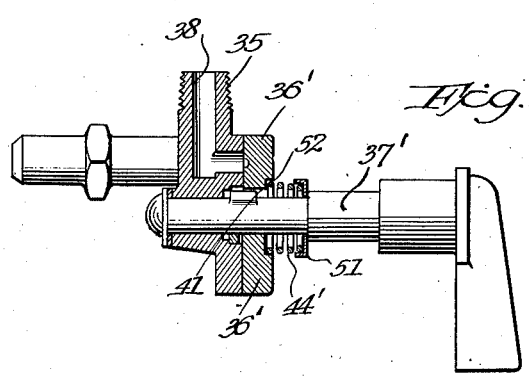
Inventor
Best Pratt
George F. Weinreich,
By Cushman, Bryant, Darby & Cushman
Attorneys

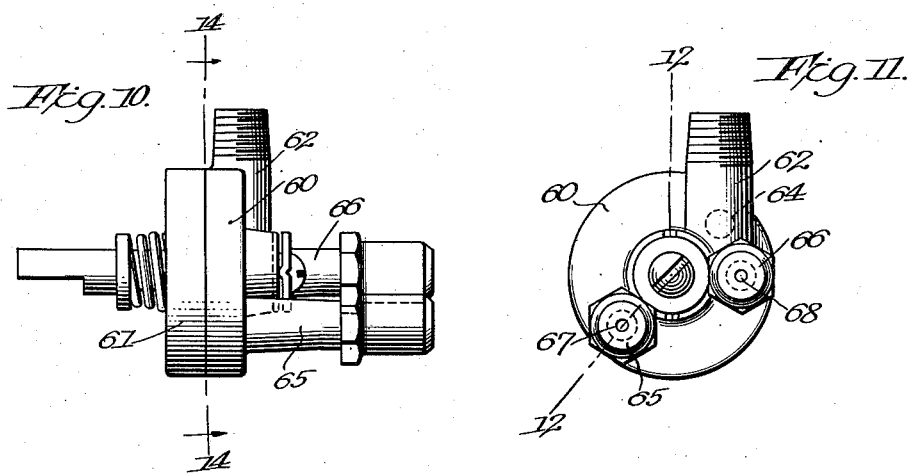
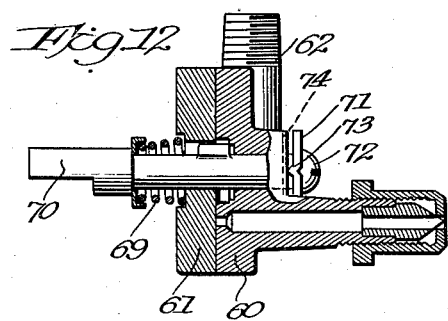
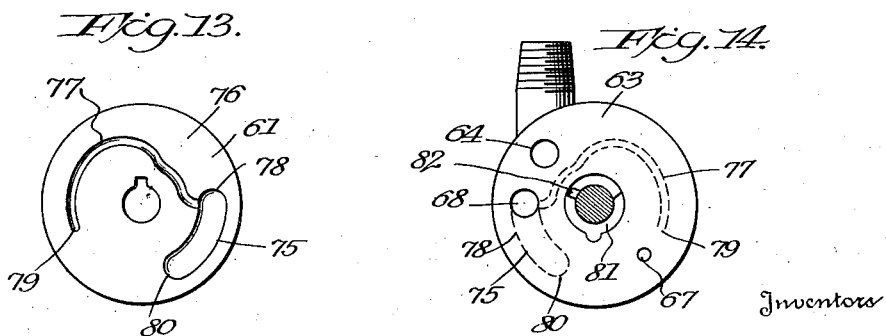

Nov. 24, 1936.   B. PRATT ET AL   2,061,716
ROTARY DISK VALVE
Filed March 27, 1933   5 Sheets-Sheet 4

Inventors
Best Pratt
George F. Weinreich

Nov. 24, 1936.   B. PRATT ET AL   2,061,716
ROTARY DISK VALVE
Filed March 27, 1933   5 Sheets-Sheet 5
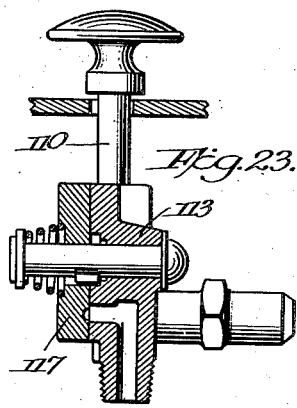
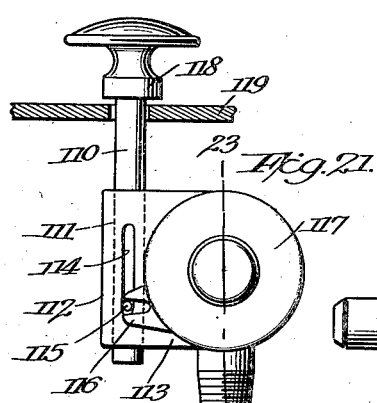
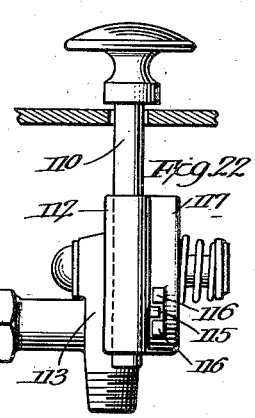
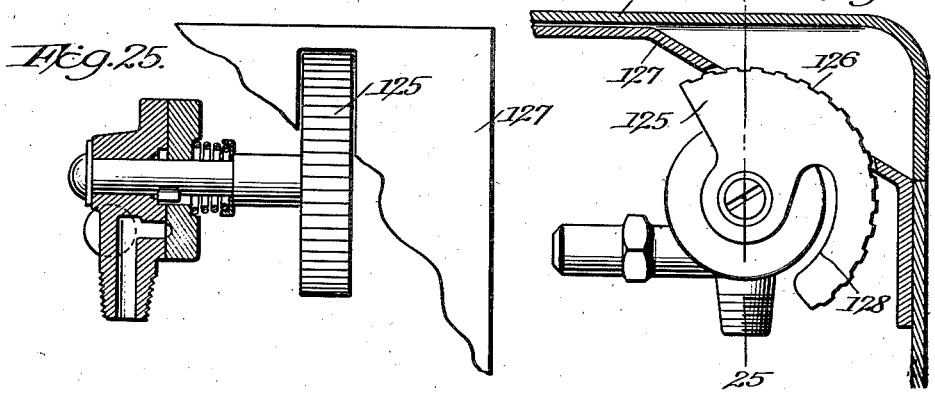
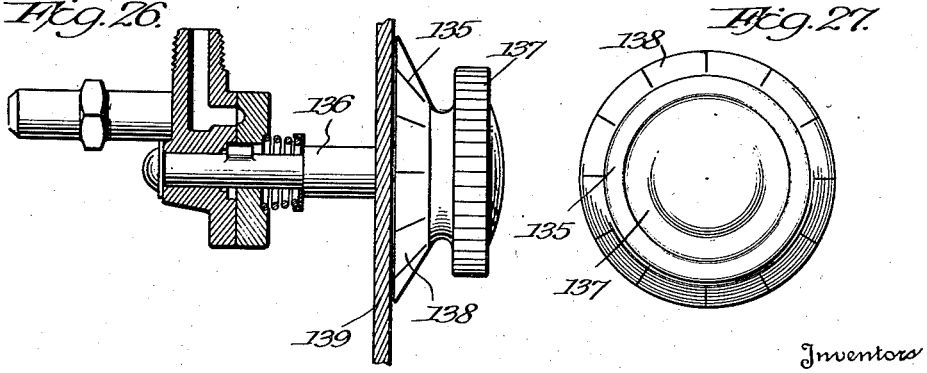
Inventors
Best Pratt
George F. Weinreich
By Cushman, Bryant, Darby & Cushman
Attorneys Patented Nov. 24, 1936

2,061,716

UNITED STATES PATENT OFFICE 2,061,716

ROTARY DISK VALVE

Best Pratt and George F. Weinreich, Chicago, Ill., assignors, by mesne assignments, to The Rotor Gas Valve Co., a corporation of Illinois Application March 27, 1933, Serial No. 663,069

3 Claims. (Cl. 251—90)

Our present invention relates to a rotary disk valve, and more particularly to a valve of this type which is especially adapted for use to control the flow of gas to the burners of a gas range.

Ranges of the latest types are designed to have a smooth paneled appearance and, to this end, the wall or outer casing of the range encloses the gas burner valves, only the operating handles of the valves being permitted to extend from the casing. In some instances, stoves of this type are so constructed that when the burners are not in use, the panels may be shifted to enclose even the operating handles of the burners. In any event, the positioning of the valve within the casing of the range subjects the valve to the heat also confined within the enclosed casing and causes the lubricant with which the valve is supplied to burn out or become gummy within a very short time. When the lubricant has burned out, the valve becomes seized to its seat and when an attempt is made to operate the valve, the handle may be broken from the valve by the person attempting to operate the same. Also, the tapered plug valves operating in conical valve seats which are ordinarily used in gas ranges, cannot be ground to form a tightly sealed fit without involving considerable expense and in order to eliminate the necessity of extremely accurate grinding and thereby make the manufacture of such valves economical, the lubricant with which the valve and its seat are supplied is relied upon to maintain the seal between the valve and seat. Therefore, when the lubricant is burned out, the seal between the valve and its seat is destroyed and the valve becomes ineffective.

An important object of the present invention is to provide a valve structure for use on gas ranges which will be operative regardless of the high temperature to which it is subjected.

Another object of the invention is to provide a valve structure which will operate without the necessity of any lubricant other than that inherent in the material of which the valve structure is formed and which valve structure may be readily and economically manufactured, particularly since no fine grinding operations will be necessary to obtain a seal between the valve and the valve body.

Another important object of the invention is to provide a disk having a port or passage in one face of the valve element, the face adjacent the valve seat, so that a housing to enclose the valve and valve body need not be provided.

Another important object is to provide improved operating devices for valves of the disk type, which operating devices are particularly constructed to conform to the recent trends of stove design discussed above.

Still another object of the invention is to provide a valve of the rotary disk type for use on gas ranges whereby the flow of gas through the valve may be very critically adjusted.

A further object of our invention is the provision of a disk valve which will regulate the flow of gas to the individual burners of a duplex burner as well as to both of the individual burners. This object also comprehends the provision of a valve which will permit the broiler and oven burners to be separately controlled and also controlled together.

We provide a valve having the valve element and valve body thereof formed of a suitable metal containing graphite or some similar lubricating substance. A valve formed of such material is self-lubricating even in the presence of extreme heat and no other lubricant need be provided to insure proper operation. Since the valve element is in disk form, the seat face of the valve body may be flat and both the valve element and the seat face of the valve body need only be ground flat to insure a proper seal between the two. The lubricant inherent in the cast iron also assists in maintaining the seal between the valve element and the valve body.

In the drawings, wherein like numerals refer to similar parts throughout the several views, Figure 1 is a plan view of a valve constructed in accordance with our invention.

Figure 5 is an elevation of the face of a valve disk which may be used with our invention.

Figure 6 is an elevation of the face of another form of valve disk which may be used with the invention.

Figure 7 is a front elevation of a modified form of valve body, with the valve disk removed.

Figure 8 is a longitudinal vertical sectional view of the valve of Figure 7, with the disk valve applied thereto.

Figure 9 is a longitudinal vertical sectional view of a slightly modified form of the valve structure shown in Figure 8.

Figure 10 is a side elevation of a modified form of valve.

Figure 11 is an end elevation of the valve shown in Figure 10.

Figure 12 is a sectional view taken on the line 12—12 of Figure 11.

Figure 13 is a front elevation of the valve disk used with the device of Figure 10.

Figure 14 is a sectional view taken on the line 14—14 of Figure 10 and showing the seat face of the valve body, the flow groove of the disk valve being shown thereon in dotted lines.

Figure 21 is a plan elevation of another form of our invention.

Figure 22 is a side elevation of the valve of Figure 21.

Figure 23 is a sectional view taken on the line 23—23 of Figure 21.

Figure 24 is a vertical cross-sectional view through a range, showing still another form of our invention in side elevation.

Figure 25 is a sectional view taken on the line 25—25 of Figure 24, portions being shown in front elevation.

Figure 26 is a central vertical sectional view showing another type of operating handle included in our invention.

Figure 27 is a front elevation of the handle used with the device of Figure 26.

Figure 1:
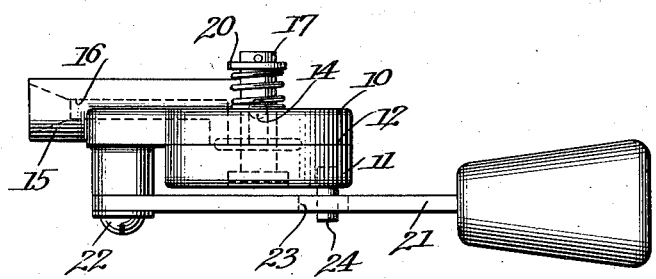
Figure 2:
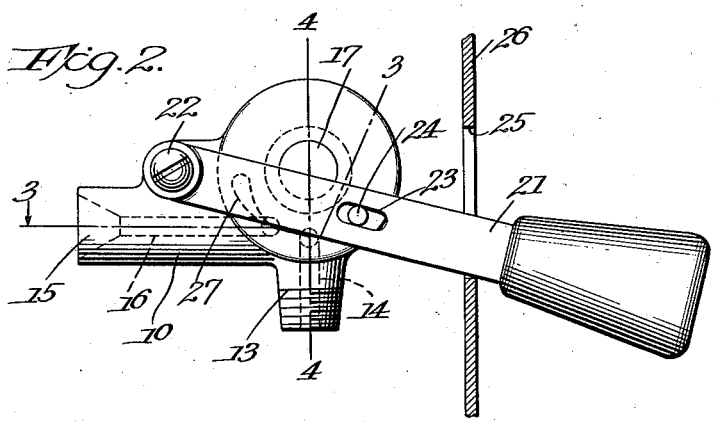
Figure 2 is a side elevation of the valve.
Figure 3:
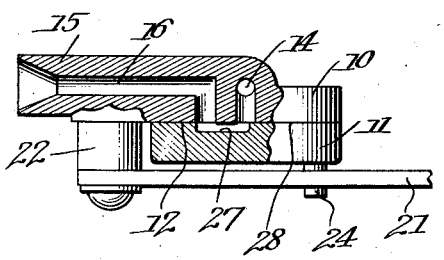
Figure 3 is a horizontal sectional view taken on the line 3—3 of Figure 2.
Figure 4:
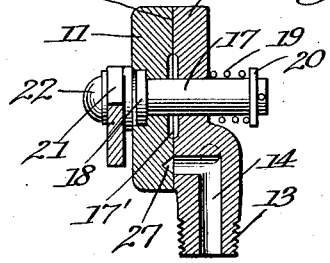
Figure 4 is a vertical transverse sectional view taken on the line 4—4 of Figure 2.
Figure 15:
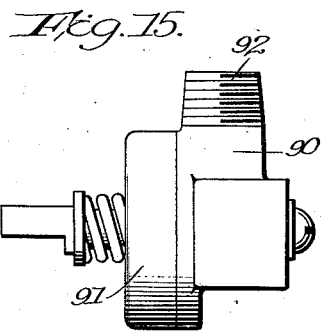
Figure 15 is a side elevation of another modification of our valve.
Figure 16:
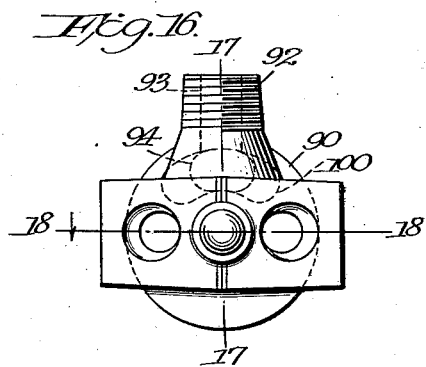
Figure 16 is an end elevation of the valve shown in Figure 15.
Figure 17:
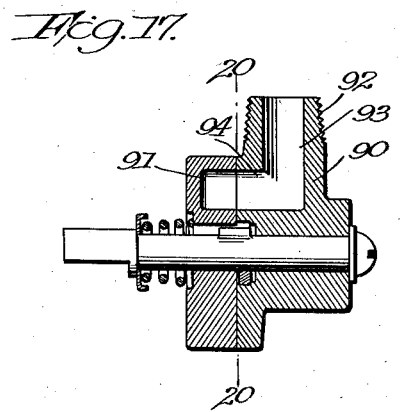
Figure 17 is a sectional view taken on the line 17—17 of Figure 16.
Figure 18:
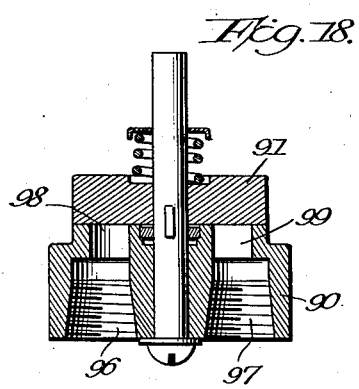
Figure 18 is a sectional view taken on the line 18—18 of Figure 16.
Figure 19:
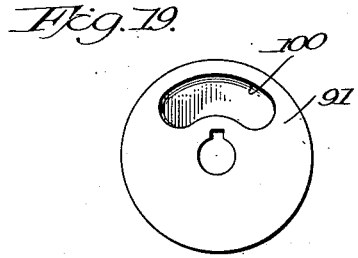
Figure 19 is an elevation of the valve disk used in the valve of Figure 15.
Figure 20:
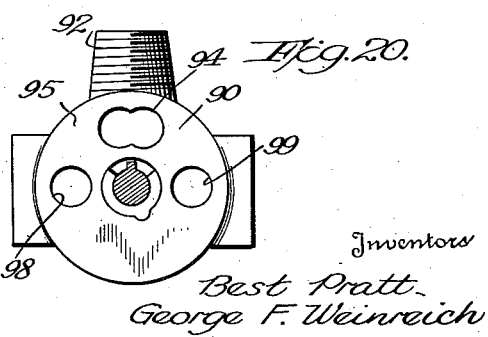
Figure 20 is a sectional view taken on the line 20—20 of Figure 17.

In Figures 1 to 4, inclusive, of the drawings, the numeral 10 designates a valve body having a valve disk 11 seated against one face 12 thereof. The valve body 10 is provided with a threaded extension 13 having a bore 14 therethrough, extension 13 being adapted to be connected to the gas supply manifold of the gas range. An extended portion 15 also having a bore therethrough designated by the numeral 16 is intended to be connected to a pipe leading to the gas burner of the range. The bore 14 of the inlet extension 13 of the valve body and the bore 16 of the outlet extension 15 are angled as best shown in Figures 3 and 4 to open to the seat face 12 of the valve body.

The valve disk 11 is rotatably mounted upon the valve body 10 and against the seat face 12 of the latter upon a pin 17 which extends through aligned axial bores in the disk and body. The aligned axial bores of the valve body and valve disk may be counter-bored as shown at 17' in Figure 4 to reduce the contacting area of the parts 10 and 11. The pin 17 is provided with a head 18 as shown in Figure 4, the headed portion 18 fitting in an enlargement of the outer end of the axial bore through the valve disk. A spring 19 surrounds the opposite end of the pin 17, the inner end of the spring bearing against the valve body and the outer end contacting with a washer 20 held upon the pin 17 by a locking or cotter pin as shown. The spring 19 thereby serves to hold the valve disk tightly seated upon the valve body.

The valve disk 11 is rotated with respect to the valve body 10 by means of a handle 21 which is pivoted upon a stud 22 threaded in the valve body 12. The handle 21 has a longitudinally extending slot 23 therein into which a pin 24 projecting from the outer face of the valve disk 11 extends. It will be understood that swinging movement of the handle 21 on its pivot 22 will cause the valve disk 11 to be rotated with respect to the valve body 10. As is shown in Figure 2, the valve handle 21 may operate in a slot 25 in the front plate 26 of the range, the ends of the slot thereby serving as stops for the valve handle.

The valve disk 11 is provided with a groove 27 in the face 28 thereof which contacts with the seat face 12 of the valve body 10. This groove is preferably arcuate and may be tapered longitudinally in cross-section as shown in Figures 1 to 5, inclusive, or may be stepped as shown at 27' in Figure 6. In either event, the groove in the valve disk is adapted, upon rotation of the disk, to bridge the ends of the supply and delivery ports 14 and 16, respectively, which terminate at the seat face 12 of the valve body.

In operation, if a disk valve having the tapered groove 27 shown in Figure 5 is used, it will be observed that when the reduced forward end 29 of the groove is brought into alignment, by rotation of the valve disk, with the infeed port 14, a limited amount of gas will flow from the infeed port 14, through the groove 27 and to the gas burner through the port or bore 16. Further rotation of the valve disk will move a more greatly enlarged portion of the groove 27 opposite the infeed port 14, thereby increasing the flow of gas to the burner.

If a valve disk 11 having the stepped form of groove 27' shown in Figure 6 is used with the valve body, rotation of the disk 11 to bring the advanced and shallow portion 30 of the groove 27' opposite the infeed port 14 will permit a limited amount of gas to flow to the burner. As rotation of the valve disk is continued to bring the wider and deeper groove 31 opposite the infeed port 14, the flow of gas will be increased.

In the forms of our device shown in Figures 7, 8 and 9, the valve body 35, valve disk 36 and operating shaft 37 are axially aligned. In this construction, the valve body is provided with an inlet bore 38 and an outlet bore extending through extensions of the valve body to the seat face 40 thereof.

In the form shown in Figure 8 the valve disk 36 is rotatably mounted against the valve body upon the operating shaft 37 the shaft extending through aligned bores in the valve disk and valve body. The bore 41 extending through the valve disk is provided at its outer end with a socketed portion 42 in which a rounded beveled shoulder 43 on the operating shaft 37 seats. The inner end of the operating shaft 37 is surrounded by a spring 44 having its inner end bearing upon a washer to hold the latter against the valve body and its outer end bearing upon a washer held in place at the extreme outer end of the shaft by a screw or the like 45. By this arrangement, the valve disk is held tightly seated against the valve body regardless of slight misalignments in the structure.

The valve disk 36 is caused to rotate with the operating handle 37 by reason of a key 46 upon the operating shaft which engages in a slot 47 in the bore 41 of the valve disk. In order to limit the rotation of the shaft 37 with respect to the valve body 35, an arcuate stop member 48 is seated in an enlarged portion 49 of the axial bore extending through the valve body. The stop member 48 is provided with a lug 50 which seats in a pocket in one side of the enlarged portion 49 of the bore, thereby holding the stop member 48 against rotation. The key 46 upon the shaft 37 is of sufficient length to extend into the enlarged portion 49 of the bore through the valve body so that rotation of the operating shaft 37 will be limited by contact of the key 46 against the respective ends of the stop member 48.

The form of the invention shown in Figure 9 is identical with that shown in Figure 8 except that the spring 44' which holds the valve disk against the valve body is positioned between the valve disk 36' and a collar 51 keyed to the operating shaft 37'. The outer end of the spring 44' bears against the collar 51 while its inner end is seated in a counter-bore 52 concentric with the bore 41 extending through the valve disk 36.

The valve disks shown in Figures 8 and 9 may be similar in form to either of the valve disks illustrated in Figures 5 and 6, that is to say, they may have either a groove tapered in cross-section as shown at 27 or a stepped groove as shown at 27'. However the counter-bores 17' would preferably not be provided on the valve disks used in the form of invention shown in Figures 8 to 9.

An operating handle 37' is provided upon the operating shaft 37 and the operation of the valve disks whereby the flow of gas will be controlled will be obvious from the description given in connection with Figures 1 to 6 inclusive.

Referring to the device shown in Figures 10 to 14, inclusive, the numeral 60 designates the valve body and the disk valve is indicated by the numeral 61. The valve body 60 is provided with a threaded extension 62 having a bore therethrough which opens to the seat face 63 of the valve body at 64 (Figure 14). The extension 62 is adapted to be connected to the gas supply manifold of the gas range.

The valve body 60 is provided on its rear surface with two extended portions 65 and 66. The extension 65 has a bore 67 therethrough which opens to a relatively small port on the seat face 63 of the valve body and the extension 66 has a bore 68 therethrough which opens to a relatively large port on the seat face 63. The extension 65 is adapted to communicate with the small burner of a duplex burner not shown while the extension 66 communicates with the larger burner of the duplex burner.

The disk valve 61 is rotatably mounted upon the valve body 62 in the manner described in connection with Figure 9 a coil spring 69 being provided between the outer face of the valve disk and a collar on the valve operating shaft 70 to hold the valve disk closely seated against the seat face of the valve body. However the valve operating shaft 70 is provided at its inner end with a disk 71 which is fixed to the inner end of the shaft 70 by means of a set screw 72. The disk 71 is provided on its inner face with a radially extending projection 73 which is adapted to cooperate with indentations 74 on the valve body as hereinafter described.

The disk valve 61 has an arcuate groove 75 in its face 76 which groove is relatively large in cross-section. A groove 77 of smaller cross-section opens from the groove 75 and extends across and about the face 76 as shown in Figure 13.

Figure 14 shows in dotted line the grooves 75 and 77 of the valve disk as they appear when the valve disk is operatively mounted upon the seat face 63 of the valve body and with the gas infeed bore 64 out of communication with the grooves 75 and 77 this being the position of the valve disk 61 when the valve is in entirely closed position and with no gas flowing to either burner of the duplex burner.

Referring to Figure 14, the operation of the valve is as follows: When the valve disk 61 is turned in a clockwise direction with respect to Figure 14, the extreme upper end 78 of the large groove 75 in the valve disk will come into communication with the gas infeed port 64 at the same moment that the extreme outer end 79 of the small groove 77 comes into communication with the port of the small bore 67. Gas will thereby flow to both burners of the duplex burner. A very slight continued rotation of the valve disk 61 will permit full flow of gas to the bore 67 leading to the small burner and will increase the flow to the port 68 leading to the large burner. It will be obvious that the further rotation of the valve disk will entirely open the flow of gas to the large port 68 without increasing the flow to the small port 67.

The disk 61 may be turned sufficiently far in a clockwise direction with reference to Figure 14 to have the lower end 80 of the large groove 75 move entirely past and out of communication with the port 68 to the larger burner, but gas will still flow to the port 67 of the small burner through the larger groove 75 and then through the smaller groove 77. It will be understood from the above that the flow of gas may be directed to both burners simultaneously or to the small burner alone.

The indentation 74 may be so positioned upon the valve body that the projection 73 on the disk 71 of the operating shaft 70 will move into this indentation when gas is flowing to both burners, with the flow of gas through the port 68 at its greatest volume. An arcuate stop member 81 may be positioned on the valve body in the manner described in connection with the stop member 48 of Figure 7 and a key 82 on the shaft 70 will engage against the opposite ends of the member 81 to indicate when the valve disk 61 is in its alternate extreme positions. In one extreme position, as shown in Figure 14, the flow of gas to both burners is entirely shut-off when the key 82 contacts with one end of the stop member 81. When the key 82 contacts with the opposite end of the stop member 81, gas will only flow to the small bore 67 leading to the smaller burner of the duplex burner.

In Figures 15 to 20, inclusive, a three-way type of valve is illustrated, this valve being particularly adapted for use in connection with ovens having one burner for broiling and a separate burner for baking. In these figures, the numeral 90 indicates the valve body and the disk valve is designated by the numeral 91. The valve body 90 is provided with an extension 92 which is provided with a bore 93 opening to a port 94 in the seat face 95 of the valve body. Connections may be made to the broiling burner and the baking burner, respectively, from threaded sockets 96 and 97 in the valve body. The socket 96 opens to the seat face 95 of the valve body through a port 98 and the socket 97 opens to the seat face through a port 99, these ports preferably being positioned diametrically opposite each other upon the valve body as shown in the drawings.

The valve disk 91 is mounted for rotation with respect to the valve body by an arrangement substantially identical with that described in connection with Figure 9. However, the valve disk is provided with one arcuate groove 100. The groove 100 is of insufficient length to be simultaneously aligned with the infeed port 94 and the ports 98 and 99 leading to the separate burners. When the valve disk 91 is turned to closed position, the groove 100 thereof will be in the position shown in dotted lines in Figure 16 and will not communicate with either of the ports leading to the burners. Rotation of the rotary disk in either direction will place the groove 100 in communication with the port 98 or the port 99, the degree of rotation in either direction determining the amount of gas flowing through the groove 100 and outflow port with which it communicates.

Figures 21 to 27 illustrate various types of operating means which may be used with any of the types of valve disks illustrated in the other figures. In this connection, it will be understood that any of the operating arrangements described herein may be used on any of the combinations of valve bodies and valve disks heretofore described.

Figures 21 to 23, inclusive, illustrate an operating handle 110 which is adapted to be moved in a straight line, by push-and-pull movement, to operate a valve. As is illustrated in these figures, the valve handle 110 is slidably mounted in a bore 111 of an extended portion 112 of the valve body 113. A slot 114 opens from the bore 111 to the exterior of the extended portion 112 and a pin 115 carried by the slide rod 110 extends through this slot and has its outer end positioned between two spaced projections 116 projecting from the periphery of the disk valve 117.

A handle 118 is provided upon the slide rod 110 and reciprocating movement of the handle 118 will, through the connections described above, rotate the valve disk 117 to the desired position. The limit of movement of the valve disk will be determined by contact of the pin 115 with the opposite ends of the slot 114. The wall of the stove is indicated in these figures by the numeral 119.

Figures 24 and 25 illustrate an operating device which comprises an operating handle or knob 125 which is of arcuate form and adapted to be operated by brushing or pushing contact, the handle 125 being provided with projections 126 on its periphery to permit it to be turned by such contact. The matter of connecting the handle 125 with the valve will be obvious from Figures 24 and 25 and the description heretofore set forth. A portion of the periphery of the handle 125 projects through the wall 127 of the range, so that the handle may be turned to the desired position. A portion of the handle may be cut away, as shown at 128, from the portion of the handle which is moved downward in opening movement of the handle. The effect of this cut-away portion is to reduce the weight of the handle on this portion of the handle, so that the handle will be substantially balanced when moving toward open position, thereby preventing the handle from dropping downwardly to open position.

The handle described above is particularly adapted for use in a range in which the handles are entirely covered when the stove is not in use. Figure 24 illustrates the manner in which the cover plate 129 of the range may be placed over the operating handle to entirely enclose the same.

In Figures 26 and 27, a graduated dial 135 is fixed to the outer end of the operating shaft 136 of the valve. The handle 137 of the dial is preferably knurled as shown and graduations are provided upon a skirt 138 to indicate the degree of gas flowing through the valve, these graduated markings cooperating with markings upon the front panel 139 of the range.

It will be noted that each of the valve members or disks described herein is provided with a substantially arcuate groove which is also of longitudinally tapered form, that is, the portion of the groove which first moves into alignment with a port in the valve body is of smaller size, in cross-section, than the portion which may subsequently move into alignment with the port.

Both the valve element and valve body of our invention are formed of a material such as cast-iron, which is self-lubricating because of the fact that it contains graphite. A valve formed of such material, and constructed as described above, needs no added lubricant to maintain its seal and can therefore be used in the presence of heat without the possibility of seizing. The valve structure may, of course, be formed of other materials having self-lubricating properties.

It will be obvious that the valve structures of our invention may be readily and economically manufactured, since no critical grinding operations are involved in their production in order to provide a proper seal.

It will be understood that the invention is not limited to the details of construction shown in the drawings and described in the specification and that the examples of the use of the various forms of the device which have been given do not include all of the uses of which the device is capable; also, that the phraseology employed in the specification is for the purpose of description and not of limitation.

We claim:

1. The combination with a valve device comprising a valve body, one face of which forms a valve seat, a shaft rotatable in the valve body and extending through the seat face thereof, and a valve member provided with a bore through which the shaft extends and positioned against the seat face of the valve body, of means to limit the turning movement of said shaft comprising a key on said shaft extending into a slot in the valve disk bore and into a counter-bore in the seat face of the valve body, and an arcuate member fixed in said counter-bore, said key being adapted to contact with the opposite ends of said arcuate member to limit turning movement of the shaft.

2. A valve device for gas ranges comprising a valve body one face of which forms a valve seat, a valve member rotatably mounted upon said face, said valve body having a supply passage and a plurality of delivery passages opening to the seat face thereof, and the valve having in its seat face an arcuate groove of relatively large cross section adapted to be aligned with one delivery passage, and a groove of relatively small cross section, the smaller groove including an arcuate portion in circumferential alignment with the larger groove and adapted to be aligned with the other delivery passage, and an off-set portion communicating with the larger groove and out of alignment with all of the passages so that upon rotation of the valve member flow may occur to both delivery passages or only to the delivery passage with which the smaller groove is adapted to be aligned.

3. The combination of a valve device comprising a valve body element, a disk like valve element rotatable with respect to the valve body, said elements including seat faces and rear faces, their seat faces having passages therein adapted to be aligned by rotation of the valve disk element, of means to rotate the valve disk element with respect to the valve body element comprising a shaft rotatable and axially slidable in the valve body element and on which the valve disk element is held for rotation therewith, said valve disk element being axially slidable with respect to said shaft, an indentation on the rear face of the valve body element, a shoulder moving with said valve disk element, said shoulder being adapted to be positioned in the indentation to hold the shaft against rotation with respect to the valve body element, and resilient means bearing on the rear face of the valve disk element to hold the indentation and shoulder, when in alignment, in engagement, and to hold the seat faces of said elements in contact.

BEST PRATT.
GEORGE F. WEINREICH.